United States Patent [19]

Uba

[11] 4,216,277
[45] Aug. 5, 1980

[54] VIBRATION RESISTANT ELECTROCHEMICAL CELL

[75] Inventor: Toshio Uba, Denver, Colo.

[73] Assignee: The Gates Rubber Company, Denver, Colo.

[21] Appl. No.: 50,589

[22] Filed: Jun. 21, 1979

[51] Int. Cl.² ............................................. H01M 2/08
[52] U.S. Cl. ...................................... 429/175; 429/178
[58] Field of Search ................................. 429/175, 178

[56] References Cited

U.S. PATENT DOCUMENTS

| 3,228,804 | 1/1966 | Weidner | 429/175 |
| 3,964,934 | 6/1976 | Ching, Jr. et al. | 429/178 |

Primary Examiner—Charles F. Lefevour
Attorney, Agent, or Firm—Curtis H. Castleman, Jr.; Raymond Fink; H. W. Oberg, Jr.

[57] ABSTRACT

A molded plastic lid for an electrochemical cell is provided with upstanding protuberant ribs or the like in a position to give direct mechanical support to a post connecting strap, which has been found to greatly improve cell vibration resistance.

11 Claims, 5 Drawing Figures

VIBRATION RESISTANT ELECTROCHEMICAL CELL

BACKGROUND OF THE INVENTION

This invention relates to electrochemical cells and batteries and means for improving vibration resistance.

Electrochemical cells and batteries are oftentimes subjected to thrusts and vibrations along various axes of the cell or battery. Cells are particularly susceptible to vibration or rotation tending to displace the cell pack of electrode plates and interleaved separators, placing the current collector tab and strap connections in stress normally lengthwise of the plates and in the direction of the respective interconnections, i.e., axially in the case of a cylindrical wound cell. It has been found that severe vibration will cause stress cracking particularly in the strap connecting the output terminal post to current collector tabs of the plates, leading to eventual loss of the electrical connection. Crack initiation and propagation is particularly severe in high purity lead straps, and current collector tabs integral with the plate grids, such as the high purity type taught in U.S. Pat. No. 3,862,861 to McClelland et al.

One attempt to solve this problem entailed crimping (indenting) the container to immobilize the cell pack but this created additional problems such as an increased tendency to fail by short-circuiting.

SUMMARY OF THE INVENTION

Briefly described, the invention is directed to a sealed electrochemical cell having an open-mouthed container, opposite polarity electrode plates, separator material interleaved between the plates, and electrolyte all confined within the container, and a molded lid of nonconductive material affixed to and sealing the mouth of the container. The molded lid includes in turn a generally planar top surface portion and at least one seat with a through bore therein, and a post connector of metal such as lead received within the seat making a through-the-lid connection. The post connector has a strap projecting laterally from the body of the post and externally of the seat (at its underneath opening) and which is cojoined to current collector tabs emanating from the electrode plates. The invention is characterized in an improved lid design which provides vibration resistance to the cell comprising at least one protuberant support portion upstanding adjacent to the seat and which is positioned to provide a mechanical support in close proximity to the laterally projecting strap.

The invention is also drawn to the improved lid itself.

BRIEF DESCRIPTION OF THE DRAWINGS

Preferred embodiments of the invention will be more particularly described with reference to the accompanying drawings, in which like numerals designate like parts, and in which.

PREFERRED EMBODIMENTS OF THE INVENTION

For illustration purposes, the invention will be described in respect to a sealed, cylindrical spirally wound lead-acid cell of the general type disclosed in the aforementioned U.S. Pat. No. 3,862,861. It will be understood that the invention is applicable to various types and configurations of batteries, including the traditional parallel plate monoblock cell and battery design.

Figure 2:
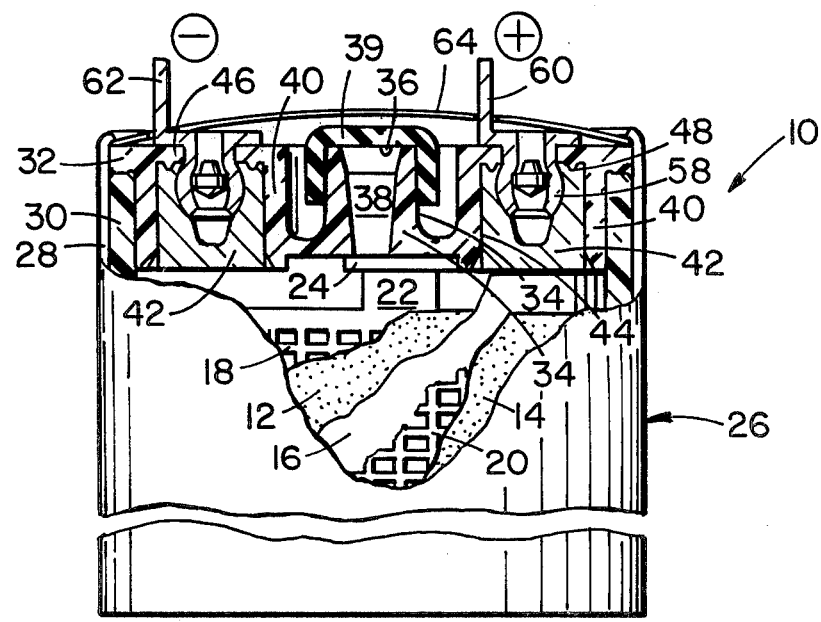
FIG. 2 is a partial cutaway sectional view of an electrochemical cell according to the invention, incorporating as a component thereof the molded lid of FIG. 1 viewed along line 2—2.

Referring first to FIG. 2, an electrochemical cell is generally shown at 10, and which includes an internal cell pack consisting of a positive plate 12 interspaced from negative plate 14 with interleaved separator material 16. The individual plates are formed of respective grid substrates 18, 20 pasted with electrochemically active material. In the case of the lead-acid battery the active materials are primarily lead dioxide and lead in formed state, respectively.

Figure 1:
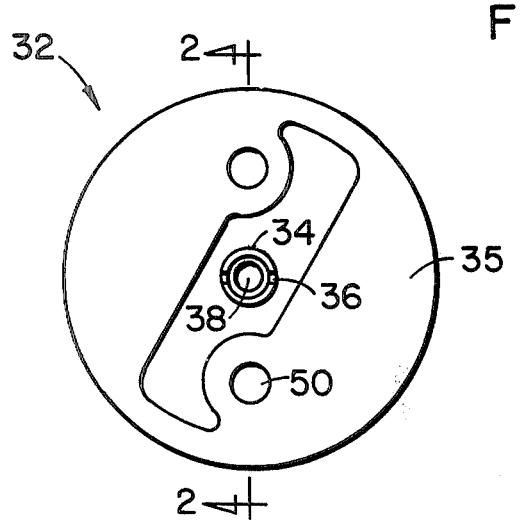
FIG. 1 is a top plan view of a molded lid of the invention.
Figure 3:
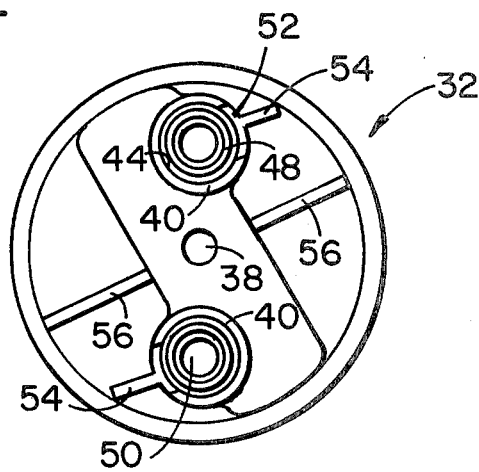
FIG. 3 depicts the lid of FIG. 1 viewed from the opposite, bottom side.
Figure 4:
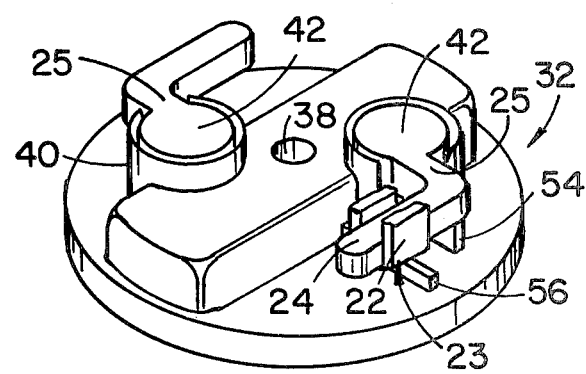
FIG. 4 is a perspective view of the bottom side of the molded lid showing the lead post and straps in assembled position.

The cell pack shown is spirally wound (as shown in U.S. Pat. No. 3,862,861, for instance), and sealed in a container 26 consisting of an inner polymeric liner 30, and an outer metallic container 28. The inner liner 30 is sealed to a molded polymeric lid 32, shown also in FIGS. 1, 3 and 4. The outer metal container 28 is crimped at its upper portion around the molded lid as shown.

The molded lid 32, which may be formed of a resilient plastic material such as polypropylene or polystyrene, for instance, generally includes a top generally planar surface 35, a central vent stem 34, and a pair of juxtaposed seats 40 for receiving lead post terminal connectors 42.

The central vent stem 34 includes a central venting passageway 38 and venting orifices 36, permitting gas release in certain circumstances from within the cell to the exterior. A bunsen valve 39 of elastomeric material is positioned over the vent stem and set to release gas at a desired pressure, e.g., 25-60 psi, and then automatically reseal when the pressure is reduced below the venting pressure. Molded seat 40 protrudes from the underside of planar surface 35 and is integral (and unitary) with the top and includes a cylindrical sidewall 44, a transverse shoulder 46 provided with annular boss 48, and includes a central bore 50 for making a through-the-lid connection to the negative and positive terminals of the cell.

Post connector 42 is received within seat 40 and forms a mutual pressure-exerting seal therewith, as disclosed more fully in U.S. Pat. No. 3,704,173 to McClelland et al. Briefly, the post 42 is formed of a deformable lead, preferably high purity soft lead, which has been expanded radially outwardly and upwardly upon actuation of blind rivet 58. In known manner, once the mandrel is extracted from the rivet, an internal expansion occurs which forces the soft lead radially outwardly and axially upwardly against shoulder 46, with lead flowing around boss 48 to fully disrupt its oxide layer and form an electrolyte-tight seal. Attached to the upper end of the rivet are terminal members 60, 62 which penetrate through openings in an upper lid 64.

Figure 5:
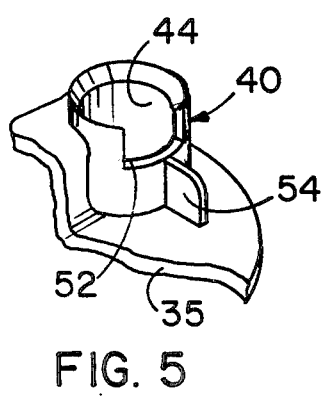
FIG. 5 is a partial, enlarged view of the molded seat and an adjacent protuberance in accordance with the invention.

The lower end of post 42 includes strap member 24 projecting laterally therefrom, and which penetrates the side of seat 40 through underside opening 52 provided therein, as shown best in FIG. 5. Strap 24, in turn, is cojoined with the current collector tabs 22 emanating from the respective positive and negative electrode plates, as by welding, as more fully described for instance in U.S. Pat. No. 4,037,077 to Harder. The welding operation produces a fused weld bead 23 resulting from partial co-melting of the lead of the tabs 22 and leg strap 24.

In accordance with the invention, the molded lid 32 on its underside is provided with at least one protuberant support 54 upstanding adjacent seat 40 in the area of strap opening 52 to provide mechanical support for the laterally projecting strap 24. The protuberant support 54 is positioned in close proximity to the strap 24, and it has been found that it is especially important to provide such support adjacent (the underside of) the strap/post interconnection area 25. By "close proximity" is meant either direct contact (preferred), or in such closely spaced relationship that vibration could cause the lead parts to come into contact with the protuberant support. The support and lead parts may actually establish a slight interference fit, or partially melted conjugate fit upon heating, if a thin support is used which is deformed by the lead parts.

It is preferred to employ additional protuberant support 56 generally centered longitudinally of the weld bead 23 and extending transversely thereof. Protuberant support 56 will extend upwardly from the under surface of lid 32 a lesser distance than support 54, to provide adequate room for the weld bead 23, so that protuberant support 56, like support 54, is also in close proximity to the strap member 24 through its welded interconnection with collector tabs 22.

It is preferred to employ a ribbed upstanding support 54 as shown which is integrally attached to the seat 40 in the area of the strap opening 52, and thereby provide support directly along the surface of strap 24 immediately adjacent the strap interconnection 25 with the post 42, which has been found an area most vulnerable to crack initiation and propagation induced by axial vibration of the cell.

Use of the second support 56 in conjunction with protuberant support 54 provides a balancing effect which evenly distributes axial loads transferred from the cell pack up through its collector tabs 22, and minimizes any chance for stress crack initiation. Clearly, while discrete supports have been shown for this purpose, these can be interconnected as a single support e.g., along the centerline of leg 24, or take on any shape required to provide a substantially conjugate physical support adjacent the strap/post and weld bead area.

The protuberant support preferably is molded as a unitary part of the lid 32, but may be formed separately and bonded to the lid, for instance. In addition to ribs, the supports could be in the form of bosses, dish-shaped, U-shaped to also provide lateral vibration resistance, ramped, etc.

Vibration tests conducted on a limited number of size "D" (2.5 ampere hour), size "X" (5.0 ampere hour) and 25 ampere hour size cells have demonstrated significant increase in test lives when employing the protuberant supports 54 and 56 of the invention. In the test, the spirally wound cylindrical cells were subjected to a sinusoidal varying load between 6 g and 18 g, with the cells being vibrated both horizontally and vertically with different tab orientations. Dramatic improvements in test lives were shown with the "X" size cell. In the vertical (axial) vibration test of the "X" size cell, the two cells had lives of 3 hours and 30 minutes and 9 hours and 45 minutes before failure, respectively, compared with the controls (which did not employ protuberances 54 and 56) having lives of 1 hour and 2 hours and 30 minutes, respectively. In the same test where the cell was vibrated horizontally (perpendicular to the axis of the cell), the cells having the improved lids of the invention had test lives of 16 hours 10 minutes and 18 hours 50 minutes, respectively, contrasted with the controls which had lives of 40 minutes and 1 hour and 5 minutes, respectively. All cells were vibrated on an All-American Tool and Manufacturing Company vibration table, Model No. 10-VP-D, with peak-to-peak travel (displacement) of the table set at 0.20 inches. The frequency was varied by increasing from 26 cps up to 42 cps, and then back to 26 cps in 18 seconds. All cells were rigidly attached to the table and oriented so that the cell axis was either parallel to the direction of travel (vertical test) or perpendicular to the direction of travel (horizontal test). The cells vibrated in the perpendicular mode had the current collector tabs positioned either in line with respect to the direction of travel, or perpendicular to the direction of travel.

While certain representative embodiments and details have been shown for the purpose of illustrating the invention, it will be apparent to those skilled in the art that various changes and modifications may be made therein without departing from the spirit or scope of the invention.

What is claimed is:

1. In a sealed electrochemical cell having an open-mouthed container, opposite polarity electrode plates, separator interleaved between the plates, and electrolyte all within the container, and a molded lid affixed to and sealing the mouth of the container, and said molded lid including a top surface portion and at least one seat with a through bore therein, and a post connector received within the seat making a through-the-lid connection and having a strap projecting laterally from the post externally of the seat and cojoined to current collector tabs attached to the electrode plates, an improved lid providing vibration resistance to the cell comprising at least one protuberant support portion upstanding adjacent said seat and positioned to provide a mechanical support in close proximity to said laterally projecting strap.

2. The electrochemical cell of claim 1 wherein said seat is attached to a planar top surface of the molded lid.

3. The electrochemical cell of claim 1 wherein at least two protuberant support portions are provided, one adjacent said seat to provide support to the strap near its junction with the post, and another support being positioned in close proximity to that area of the strap cojoined to the current collector tabs.

4. The electrochemical cell of claim 3 wherein at least one of said supports makes direct contact with said strap or with that portion of the strap cojoined with the current collector tabs.

5. The electrochemical cell of claim 1 wherein the protuberant support is formed of a rib integral with and extending laterally from said seat in substantial longitudinal alignment with said strap.

6. The electrochemical cell of claim 3 wherein the current collector tabs and strap are welded together forming a bead interconnection, which is in close proximity to one of said protuberant support portions.

7. A molded plastic lid for use in an electrochemical cell comprising:
   a generally planar top surface portion;
   at least one molded seat projecting from one side of the said lid and having a through bore therein, receiving a metal terminal post connector in the bore; and
   at least one protuberant support portion upstanding from a surface of the lid and positioned to provide mechanical support in close proximity to a metal extension laterally projecting from said post.

8. The molded lid of claim 7 wherein said seat is provided with a lateral window opening adapted to accommodate said laterally projecting portion.

9. The molded lid of claim 8 wherein the protuberant support is attached to a sidewall of said seat at the opening, and projects generally perpendicularly outwardly therefrom.

10. In a sealed lead-acid electrochemical cell or battery having an open-mouthed plastic container, opposite polarity electrode plates, separator material interleaved between the plates, and electrolyte absorbed within the plates and separators and all confined within the container, and a molded lid of acid-resistant plastic affixed to and sealing the mouth of the container, and said molded plastic lid including a generally planar top surface portion and at least one seat attached to one side of the planar surface with a through bore therein, and a post connector received within the seat making a through-the-lid connection and having an elongate strap projecting laterally from the post externally of the seat and welded to current collector tabs of lead attached to the electrode plates, an improved lid providing vibration resistance to the cell comprising at least one protuberant supporting rib upstanding adjacent to the seat and positioned to provide a mechanical support in close proximity to the laterally projecting strap.

11. The electrochemical cell of claim 10 wherein two discrete upstanding ribs are provided, one immediately adjacent said seat where the strap joins the post connector, and the other rib positioned in close proximity to the welded connection between the strap and current collector tabs, the latter rib extending generally transversely to the elongate strap portion.

* * * * *